United States Patent
Puerkner et al.

(10) Patent No.: US 6,641,911 B1
(45) Date of Patent: Nov. 4, 2003

(54) USE OF SELECTED ADHESIVE MIXTURES FOR OVERLAP ADHESION OF ROUND LABELS WHEN APPLIED TO PLASTIC BOTTLES

(75) Inventors: Eckhard Puerkner, Duesseldorf (DE); Andreas Ferencz, Duesseldorf (DE); Marcus Heemann, Neuss (DE); Thomas Huver, Duesseldorf (DE); Hermann Onusseit, Haan (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/600,035

(22) PCT Filed: Dec. 23, 1998

(86) PCT No.: PCT/EP98/08423

§ 371 (c)(1),
(2), (4) Date: Sep. 13, 2000

(87) PCT Pub. No.: WO99/35199

PCT Pub. Date: Jul. 15, 1999

(30) Foreign Application Priority Data

Jan. 10, 1998 (DE) .......................................... 198 00 676

(51) Int. Cl.[7] .............................. B65C 3/06; C09J 4/06; C09J 175/16

(52) U.S. Cl. .................... 428/345; 156/215; 156/273.3; 156/275.3; 156/275.7; 156/331.4; 156/DIG. 9

(58) Field of Search .............................. 156/215, 331.4, 156/272.2, 273.3, 275.1, 275.3, 275.5, 275.7, DIG. 8, DIG. 9; 525/920, 455; 428/343, 345, 350; 215/12.2; 220/62.14, 62.22

(56) References Cited

U.S. PATENT DOCUMENTS

| | | | | |
|---|---|---|---|---|
| 4,380,613 A | * | 4/1983 | Nativi | 525/920 |
| 4,452,964 A | * | 6/1984 | Saracsan | 525/920 |
| 4,514,464 A | * | 4/1985 | Gomez | 156/331.4 |
| 4,920,157 A | * | 4/1990 | Schulz et al. | 525/920 |
| 5,478,427 A | | 12/1995 | Huver et al. | |
| 5,538,575 A | * | 7/1996 | Hinton | 156/215 |
| 5,897,722 A | * | 4/1999 | Bright | 156/86 |
| 5,985,074 A | | 11/1999 | Heemann | |
| 6,325,879 B1 | * | 12/2001 | Heckman et al. | 156/215 |

FOREIGN PATENT DOCUMENTS

| | | |
|---|---|---|
| DE | 2913676 | 10/1980 |
| DE | 19538468 | 4/1997 |
| DE | 19853813 | 6/1999 |
| EP | 0564483 | 10/1993 |
| EP | 0603046 | 6/1994 |
| EP | 0768353 | 4/1996 |
| WO | WO9701483 | 1/1996 |
| WO | WO9929754 | 6/1999 |

OTHER PUBLICATIONS

RadTech Europe '95—Maastricht; W. Karmann, S. Zoellner, Radiation Curing of Pressure Sensitive Adhesives: An Overview.

Polymers Paint Colour Journal; S. Peeters, J. M Loutz & M. Philips; "Overview of Dual Cure Possibilities in UV Coatings".

* cited by examiner

*Primary Examiner*—Steven D. Maki
*Assistant Examiner*—Gladys Corcoran
(74) *Attorney, Agent, or Firm*—Stephen D. Harper; Michael E. Carmen

(57) ABSTRACT

Adhesive systems are useful for bonding wrap-around labels using an overlap adhesive in their application to blown plastic containers, more particularly plastic bottles. The adhesive system includes reactive contact adhesives based on multifunctional macromonomer compounds curable in steps by different reaction mechanisms, which may also be present mixed with one-stage reactive mixture components.

23 Claims, No Drawings

USE OF SELECTED ADHESIVE MIXTURES FOR OVERLAP ADHESION OF ROUND LABELS WHEN APPLIED TO PLASTIC BOTTLES

This invention relates to the use of selected adhesive systems for bonding so-called wrap-around labels using an overlap adhesive in their application to blown plastic containers, more particularly plastic bottles.

The steadily increasing number of plastic bottles, particularly based on the PET (polyethylene terephthalate), in the beverage industry is attributable above all to three major advantages of plastic over glass bottles, namely: the considerably lighter weight, the fact that plastic bottles are unable to shatter and the reduction in the transport weight, particularly of so-called empties. Another advantage of plastic bottles is that they can be repeatedly reused. However, this does presuppose the complete and clean removal of all residues, not only inside the bottles but also on their outer surface. This means above all that the labels used to identify the contents of the bottles and the adhesives used to apply them or rather residues of the constituents in question should be able to be reliably removed.

The plastic bottles used in particular for soft drinks containing carbon dioxide were originally labelled with so-called shield labels. In their case, adhesive had to be directly applied between the label and the outer surface of the bottle. In order to reduce the disadvantages this involves, wrap-around labels are now also commonly used for cylindrical bottles. Wrap-around labels are labels which completely surround the circumference of the bottle. In this type of labelling, the labels first have to be fixed to the wall of the bottle which can be done, for example, by so-called pick-up adhesives but also by simply forming a layer of moisture on the outer surface of the bottle. Overlap bonding is then carried out, i.e. the end of the label is fixed to the beginning of the label using a suitable adhesive without establishing direct contact between the outer surface of the bottle and the adhesive region.

Foil labels of the type in question are now based predominantly on plastics. They are supplied as a foil roll and are only cut continuously into individual labels in the roll labelling machine. Modern plastic bottle labelling technology is characterized by high throughputs per unit of time so that, for example, 6 to 10 bottles per second are provided with wrap-around labels. It will be readily be appreciated that, under these conditions, the overlap adhesive to be applied to the end of the labels in strip form has to meet stringent and very diverse requirements. Rapid and uninterrupted machine application—without problems, such as stringing—coupled with adequate adhesion immediate after the two label ends to be joined have been fitted together are essential requirements. However, the overlap adhesive used has to meet a much broader range of requirements. The following problem areas are mentioned purely by way of example in this regard: the curing of the adhesive joint and its strength have to be able durably to withstand the forces acting on the wrap-around label. Adhesive systems of the type commonly used today as bottle labelling adhesives form undesirable ribbed or wavy adhesive joints in the dry state. However, one of the greatest problem areas lies in the fact that the pressure inside the bottle can vary significantly, particularly when the bottles are filled with beverages containing carbon dioxide. Unavoidable temperature variations during the storage and transportation of the filled and sealed bottles lead to corresponding variations in internal pressure. In contrast to the old glass bottle, the thin-walled plastic bottle is able to accommodate such variations to a certain extent by volume adaptation. It will readily be appreciated that very considerable tensile stresses are thus applied to the adhesive joint of the wrap-around label applied.

The outcome of such processes is often a partial displacement in the adhesively bonded label ends relative to one another, as a result of which parts of the adhesive are released onto the visible outer surface of the wrap-around label. These visible areas of the adhesive strip are particularly vulnerable to soiling and, accordingly, are undesirable.

Accordingly, the problem addressed by the present invention was to provide adhesives or adhesive systems which could be used with particular advantage as so-called overlap adhesives in the labelling of plastic bottles with wrap-around labels.

SUBJECT OF THE INVENTION

Accordingly, the present invention relates to the use of reactive adhesives reacting off in several steps based on curable polyfunctional macromonomer compounds—also referred to hereinafter as "polyfunctional macromers"—which contain moisture-curing isocyanate groups, at least partly together with olefinically unsaturated radically reactive groups, in their molecular structure as reactive binder components curable by different reaction mechanisms—referred to hereinafter as "binder components A"—in overlap adhesives for the application of wrap-around labels to plastic bottles.

More particularly, the present invention relates to the use of the multicomponent mixtures described in the following based on the binder components A in admixture with other binder components.

PARTICULARS OF THE TEACHING ACCORDING TO THE INVENTION

The use of selected adhesives or adhesive components from the field of so-called dual-cure adhesives has proved to be useful in providing an improved solution to the various problems discussed at the beginning in the field of application in question. The composition characterized as binder component A from the field of adhesive materials is distinguished by the fact that its curing mechanism on the one hand allows an increase in the size of the molecule through the reaction of radically reactive olefinically unsaturated groups in the macromer molecule, but on the other hand guarantees additional setting through an increase in the size of the molecule under the effect of moisture by virtue of the presence of free isocyanate groups in the polyfunctional macromer or macromer mixture.

DE-OS 29 13 676 describes a process for the production of laminated films using solventless adhesives. More particularly, this document describes an adhesive liquid at room temperature which consists of oligomeric and/or polymeric esters and/or ethers which contain both free isocyanate groups and free (meth)acrylate groups in one molecule. The teaching of EP-B1 0 564 483 relates to reactive contact adhesives, to processes for their production and to their use. The document in question describes urethane-based coating compositions curable in two stages which, through a content of UV-curable acrylate groups, can be cured in a first curing step to form a firm, but still formable or embossable material which is irreversibly hardened in a following second step. Monofunctional acrylates may be added to the adhesive to reduce its viscosity. The application envisaged for the contact adhesive described in the document in question is said to be the bonding of wood and/or plastic parts at temperatures of up to about 70° C. and preferably at room temperature. However, none of the literature references cited above discloses the use of these multifunctional macromer molecules reacting off in several stages in conjunction with their use as a reactive binder component in overlap adhesives of the type with which the present invention is concerned for applying wrap-around labels to plastic bottles. In particular, none of the references cited above describes the multicomponent mixtures disclosed in detail hereinafter and the mixture components preferably used in accordance with the invention as further constituents of the adhesive compositions for the field of application with which the invention is concerned.

Those parts of the reactive adhesives used which are referred to as "binder component A" in the present specification are generally multicomponent mixtures of the following two types of polyfunctional macromers. One type contains the olefinically unsaturated reactive groups reacting off by the radical mechanism together with moisture-curing isocyanate groups in its molecular structure. Representatives of this type are generally combined in reaction component A in admixture with polyfunctional macromers which contain moisture-curing isocyanate groups in their molecular structure without the simultaneous attachment of the radically reacting olefinically unsaturated groups. Further particulars on the type, quantity ratio and production of such macromer mixtures as reaction component A can be found in the following.

In the preferred embodiment of the invention, the binder components A are used in admixture with another group of reactive substances referred to hereinafter as "binder component B". Both certain selected representatives of the class of materials described hereinafter and mixtures of various representatives of this class may be used as binder component B. The characteristic of the binder components B is that they are also reactive resins, but react off by only one reaction mechanism. The reaction mechanism selected in accordance with the invention for binder component B is the radical reaction which is discussed in detail in the following.

According to the invention, monofunctional and/or preferably polyfunctional radically reacting mixture components free from isocyanate groups are used as binder component B in admixture with binder component A. According to the invention, the particularly preferred class of these additional components are radically reacting bifunctional compounds which may optionally be present in admixture with—preferably small quantities of—radically reacting representatives of this type with higher functionality. More particularly, corresponding radically reacting trifunctional mixture components may be used.

The technical significance of this combined use of binder components A and binder components B is illustrated by the following description of the complex problems which the invention seeks to solve:

The extremely high throughput rates mentioned above in the labelling of plastic bottles with wrap-around labels require a low-viscosity, thin and quick-spreading character of the adhesive composition for application of the adhesive. Unwanted side effects, such as stringing and the like, should not occur. However, after a very short time interval, the two ends of the particular wrap-around label are then fitted together. In this phase of the process, the thin adhesive layer applied must be at least tacky enough to stop the two ends of the label from separating—even partly—at this early stage. The full adhesive strength required for subsequent use can then be developed in a subsequent, relatively long phase.

Accordingly, one of the main difficulties lies in particular in the conflicting requirements of the initial phase of the bonding process.

The teaching according to the invention enables an optimal solution to be achieved, particularly through the use of the following three operational and material parameters.

Binder component A is at least partly bifunctional in its curing mechanisms. One reaction mechanism—the radical reaction—can be directly initiated through the choice of the working conditions, more particularly through exposure to radiation and/or through the use of radical-forming initiators. This is accompanied by the required molecule enlargement and the resulting increase in tackiness of the surface layer of adhesive and in the adhesive strength within the layer of adhesive. In preferred embodiments, the teaching according to the invention is characterized by the use of adhesive components B for reinforcing the first stage of the reaction within the very short time available. The only reaction mechanism available in this regard is the radical binding process which has to be briefly initiated and which takes place very quickly. Nevertheless, a distinct increase in the setting rate in this first brief phase of application of the adhesive is achieved by using only limited quantities of polyfunctional radically reacting binder components B. General expert knowledge will make it clear that particular significance is attributed to B as bifunctional radically reacting components. They substantially increase the required molecule enlargement in the short time available and thus increase tackiness without ultimately leading to any unwanted hardening or even embrittlement of the adhesive composition.

The multifunctional crosslinking of the adhesive composition ultimately required may then take place through the free isocyanate groups of binder component A by the moisture curing mechanism.

Finally, however, consideration should also be given—precisely in connection with the initial phase of the adhesive application process and establishment of the required bond—to the following operational parameters of which the appropriate use can be an important element of the teaching according to the invention. As already mentioned, it is preferred in accordance with the invention to apply the adhesive at a high temperature of the adhesive-forming composition. In this way, the viscosity of the as yet unreacted material is significantly reduced and smooth spreadability is promoted. However, upper temperature limits are imposed in this connection by the plastics forming the particular bottle and the label and their temperature-dependent material parameters. Application of the wrap-around label should not of course lead to any temperature-controlled deterioration in the plastic wall. The same consideration naturally applies to a greater extent in the application of plastic-based wrap-around labels. Excessive thermal stressing here can lead to the unwanted formation of waves or ribs in the adhesive-coated region. Accordingly, suitable upper temperature limits for application of the adhesive are about 100° C. and preferably in the range from 70 to 90° C. The resulting hot adhesive joint undergoes the brief radical reaction with enlargement of the molecule although, at the same time, the adhesive composition is also cooled in practice. However, the resulting increase in the viscosity and tackiness of the layer of adhesive applied goes precisely in the right direction required for technical procedure. It is clear from this that the technical results required can be optimally achieved through the still comparatively large number of control parameters of the adhesive-forming multicomponent mixture used. The following preferred element of the teaching according to the invention is of relevance in this regard:

The work on which the invention is based has shown that the basic chemical structure of the macromeric binder component A—which is of course preferably present as the main constituent of the multicomponent mixture in accordance with the invention—can also be of particular significance in the initial phase of the bonding process. Thus, preferred binder components A according to the invention are characterized in that their macromer structure is oligoester-based and/or more particularly oligourethane based. Particularly suitable binder components A of this type are those which, on a statistical average, contain at least one isocyanate group in the macromer molecule for the same or preferably smaller numbers of radically reacting olefinically unsaturated groups. The basic oligourethane chain in particular—with its still comparatively numerous hetero atoms—clearly promotes the increase in adhesion even in the initial phase of the process according to the invention.

Accordingly, preferred binder components A are compounds which have been produced from isocyanate-terminated, preferably chain-like oligourethanes through partial conversion of the terminal isocyanate groups into radically reacting olefinically unsaturated substituents. This conversion may be carried out very easily in known manner by partly reacting off the isocyanate groups with esters of olefinically unsaturated acids containing at least one free hydroxyl group. Corresponding hydroxyl-containing esters of acrylic and/or methacrylic acid are particularly suitable. Particulars of this known partial modification of the basic molecule forming binder component A can be found in EP-B1 of 564 483, which was cited earlier on, and in the prior art literature cited therein.

It was found in the development of the teaching according to the invention that macromer mixtures suitable as binder component A can be obtained even with a comparatively limited reaction of the reactive isocyanate groups originally present in the macromer with, for example, esters of olefinically unsaturated acids containing a free hydroxyl group. Accordingly, macromer mixtures potentially suitable as binder component A consist predominantly of representatives which only contain the moisture-curing isocyanate groups as reactive constituents and in which only a comparatively limited number of representatives of the subgroup reacting off by the two different reaction mechanisms of the radical-initiated reaction and the moisture curing reaction are present. In the above-described preparation of the mixtures of macromer types under discussion here, it may be preferred in accordance with the invention for at most about 40% and, more particularly, up to about 30% of the isocyanate groups present to be converted by reaction into radically reacting olefinic substituents at the macromer molecule. Particularly suitable reactive components A may consist of mixtures of the type mentioned which have been prepared by reacting off about 10 to 25% of the isocyanate groups present and converting them into radically reacting olefinic substituents.

The preferred representatives of binder component(s) A according to the invention may be further characterized by numerically limited average molecular weights. These macromer molecules preferably have average molecular weights in the range from 700 to 5000 and, more particularly, in the range from about 1000 to 2500.

Preferred representatives of the binder component(s) B are also oligomer-based. In particularly important embodiments, they are corresponding acrylates and/or methacrylates of oligoethers and/or oligoesters which have an average molecular weight of preferably up to at most 2000 and more preferably in the range from 800 to 1000. Full particulars of the known characteristics and production of—in particular—multifunctional radical components of this type can be found in applicants' earlier application on adhesives curing in several stages (German patent application 197 54 926 8). The disclosure of this earlier patent application and the specific disclosure of EP 0 564 483 already cited in detail are hereby specifically included as part of the disclosure of the present invention.

Preferred mixture ratios for the mixtures of binder components A and binder components B used in accordance with the invention are those in which the binder component(s) A is/are predominant. Thus, binder components of type A preferably make up at least about 60 to 70% by weight of the mixture of binder components A and B. In one particularly preferred embodiment, the binder mixture is by far predominantly made up by binder component A where binder component B consists at least substantially of polyfunctional and, more particularly, bifunctional radically reacting oligomer compounds of the type mentioned. In this case, binder component(s) A preferably make(s) up at least 80% by weight and, more preferably, from 90 to 99.5% by weight, based on the sum of binder component(s) A plus binder component(s) B.

The preferred requirement according to the invention of using the overlap adhesive as a mixture free from volatile solvents can be particularly important for the choice of the reactive components used in accordance with the invention. Another preferred embodiment is characterized by the use of mixtures of reactive components A and B which, in the fresh state, have melt viscosities in the range from 500 to 3000 mPas and, more particularly, in the range from about 800 to 2500 mpas at temperatures of 70 to 90° C.

The use of UV radiation in combination with known initiators or catalysts is particularly suitable for promoting the partial radical reaction in the early phase of the formation of the adhesive bond. General expert knowledge may be applied in this regard. Numerous photoinitiators of the type in question here are commercial products. They are generally compounds which are capable of initiating the radical reaction of olefinically unsaturated double bonds on exposure to light with a wavelength of about 260 to about 480 mn. The following products are mentioned purely by way of example in this connection: benzophenone, camphor quinone, Quantacure (manufacturer: International Bio-Synthetics), Kayacure MBP (manufacturer: Nippon Kayaku), Esacure BO (manufacturer: Fratelli Lamberti), Trigonal 14 (manufacturer: Akzo), photoinitiators of the Irgacure®, Darocure® and Speedcure® series (manufacturer Ciba-Geigy, also obtainable under a different name from BASF, Fratelli Lamberti and Kawaguchi), Darocure® 1173 and/or Fi 4 (manufacturer: Eastman). Of these products, Irgacure® 651, Irgacure® 369, Irgacure® 184, Irgacure® 907, Irgacure® 1850, Irgacure® 1173 (Darocure® 1173), Irgacure® 1116, Speedcure® EDP, Speedcure® ITX, Irgacure® 784 and Irgacure® 2959 and mixtures of two or more thereof are particularly suitable.

As mentioned above, it can be important so far as the initial phase of the stresses occurring in the adhesive strip are concerned to apply the overlap adhesive to the end of the label at temperatures of the adhesive mixture well above wall temperature of the plastic bottle to be labelled. Temperature differences between these two parameters of at least 20 to 40° C., for example, are preferred.

The following observations provide more detailed information on preferred binder components B according to the invention. Preferred adhesive mixtures contain at least one compound with a molecular weight of about 100 to less than 800–1000 which contains at least two functional groups curable by exposure to UV light or electron beams. Particularly suitable binder components B are acrylate or methacrylate esters with a functionality of two or more. These include, for example, esters of acrylic acid or methacrylic acid with aromatic, aliphatic or cycloaliphatic polyols or acrylate esters of polyether alcohols.

Suitable aliphatic polyols contain in particular 2 to 4 hydroxyl groups per molecule and 2 to 40 carbon atoms. The hydroxyl groups may be both primary and secondary hydroxyl groups. Suitable aliphatic polyols include, for example, ethylene glycol, propane-1,2-diol, propane-1,3-diol, butane-1,4-diol, butane-3-diol, butane-2,3-diol, the corresponding butene diols and pentane diols, including the isomeric pentane diols, pentene diols or even pentine diols and mixtures of two or more of these components. However, corresponding diols with a relatively large number of carbon atoms, for example hexane diols, heptane diols and octane diols, and the corresponding unsaturated compounds are also suitable basic components for the synthesis of binder component B.

Also suitable are higher alcohols, such as glycerol, trimethylol propane, pentaerythritol and sugar alcohols. Corresponding oligomeric ethers of such polyols, such as oligoglycerols with a degree of oligomerization of about 2 to 4, are also suitable.

Other suitable polyol components for the production of the acrylate or methacrylate esters are the reaction products of low molecular weight polyhydric alcohols with alkylene oxides which are known as polyether polyols. General expert knowledge may be applied in this regard. Polyether polyols with an average molecular weight of about 100 to 800 and preferably of about 150 to about 400 can be particularly suitable basic components for binder component B.

Of the difunctional, trifunctional or higher acrylate monomers suitable for use as binder component B in accordance with the invention, tripropylene glycol diacrylate, neopentyl glycol propoxyl di(meth)acrylate, dimethylol propane tri(meth)acrylate and pentaerythritol triacrylate are preferred.

The adhesive used in accordance with the invention may optionally contain additives which may make up as much as about 49% by weight of the adhesive as a whole. Smaller additive contents, for example of up to about 30 to 35% by weight, are preferred.

Additives suitable for use in accordance with the invention include, for example, plasticizers, stabilizers, antioxidants, dyes and fillers.

Suitable plasticizers are, for example, plasticizers based on phthalic acid, more particularly dialkyl phthalates, preferred plasticizers being phthalic acid esters which have been esterified with a linear alkanol containing about 6 to about 12 carbon atoms. Other suitable plasticizers are, for example, corresponding known compounds based on benzoate plasticizers and/or phosphate plasticizers, derivatives of polyethylene glycols, for example corresponding diphenyl ethers, liquid resin derivatives, vegetable and animal oils, such as glycerol esters of fatty acids and polymerization products thereof.

Stabilizers and antioxidants suitable for use as additives in accordance with the invention include hindered phenols of high molecular weight, polyhydric phenols and sulfur- and phosphorus-containing phenols. General expert knowledge may be applied in this regard.

Other additives may be incorporated in the adhesives according to the invention to vary certain properties. Examples of such additives are dyes, such as titanium dioxide, and fillers, such as talcum, clay and the like. Small quantities of thermoplastic polymers—for example ethylene/vinyl acetate (EVA), ethylene/methacrylate and ethylene/n-butyl acrylate copolymers which optionally provide the adhesive with additional flexibility, toughness and strength—may also be used. General expert knowledge on such additives may be applied in this regard.

EXAMPLE

An adhesive mixture according to the invention is prepared from components A and B below:

Component A:

A polymer with an NCO content of 4.4% by weight (molecular weight ($M_n$) about 2000) was prepared from 32% by weight of a polyester with a molecular weight of about 800, 33% by weight of a polypropylene glycol with a molecular weight of about 1000, 9% by weight of a polypropylene glycol with a molecular weight of about 400, 24% by weight of toluene diisocyanate (TDI) and about 5% by weight of 4,4'-diphenyl methane diisocyanate (MDI). The viscosity of the multicomponent mixture is about 5200 mPas (Brookfield CAP 200, 70° C., cone 6, 50 r.p.m., measuring time 25 s). 10% of the NCO groups are reacted with hydroxyethyl acrylate. The product thus obtained (binder component A according to the invention) has an NCO content of 4.0 and a viscosity of about 5700 mPas.

Polyethylene glycol 200 diacrylate is used as component B.

The photoinitiator marketed under the name of Irgacure® 369 is added to the mixture of components A and B. More particularly, 100 parts by weight of component A are mixed with 5 parts by weight of component B and 1 part by weight of the photoinitiator. The mixture is then tested for its adhesion values by application to a polyethylene terephthalate (PET) film and exposure to UV light for fractions of a second and then joining the ends of the film together. The following results were obtained:

| | |
|---|---|
| after 30 mins. | 0.3 N/15 mm |
| after 7 days | 7 N/15 mm |
| after 14 days | 8 N/15 mm |

What is claimed is:

1. A method for the application of a wrap-around label to a container, the method comprising applying an adhesive composition to at least a portion of the label, the adhesive composition comprising as binder component A a curable polyfunctional macromonomer containing moisture-curing isocyanate groups and olefinically unsaturated radically reactive groups, the isocyanate groups and radically reactive groups curing by different reaction mechanisms; and
   overlap bonding the label around the container.

2. The method of claim 1 wherein the container comprises a plastic bottle.

3. The method of claim 1 wherein the adhesive composition comprises binder component A mixed with a binder component B wherein component B is selected from the group consisting of mono- and polyfunctional radically reacting mixture components which are free from isocyanate groups.

4. The method of claim 3 wherein binder component B comprises bifunctional radically reacting mixture components which are free from isocyanate groups.

5. The method of claim 1 wherein the step of applying an adhesive comprises applying an adhesive composition wherein binder component A comprises a mixture of i) polyfunctional macromonomers having only moisture-curing isocyanate groups and ii) polyfunctional macromonomers having both isocyanate groups and radically reacting olefinically unsaturated groups.

6. The method of claim 1 wherein the step of applying an adhesive comprises applying an adhesive composition wherein binder component A comprises one or more compounds selected from the group consisting of compounds having a macromonomer structure that is oligoester-based, compounds having a macromonomer structure that is oligourethane-based and mixtures thereof.

7. The method of claim 6 wherein the one or more compounds contain a statistical average of at least one isocyanate group and a less than or equal amount of radically reacting olefinically unsaturated groups in the macromonomer structure.

8. The method of claim 3 wherein the step of applying an adhesive comprises applying an adhesive composition wherein binder components A and B are compounds having radically reacting groups capable of reacting off by exposure to UV light or electron beams.

9. The method of claim 1 wherein the step of applying an adhesive comprises applying an adhesive composition further comprising at least one photoinitiator.

10. The method of claim 3 wherein the step of applying an adhesive comprises applying an adhesive composition wherein binder component A represents from about 60 to about 99.5% by weight of the adhesive composition.

11. The method of claim 3 wherein the step of applying an adhesive comprises applying an adhesive composition wherein binder component A represents from about 80 to about 99.5% by weight of the adhesive composition.

12. The method of claim 1 wherein the step of applying an adhesive comprises applying an adhesive composition wherein binder component A includes a compound prepared by reacting isocyanate-terminated chain-link oligourethanes with a compound selected from the group consisting of acrylates containing at least one OH group, methacrylates containing at least one OH group and mixtures thereof.

13. The method of claim 3 wherein the step of applying an adhesive comprises applying an adhesive composition wherein binder component B includes one or more oligomer-based compounds selected from the group consisting of acrylates of oligoethers, methacrylates of oligoethers, acrylates of oligoesters, methacrylates of oligoesters and mixtures thereof.

14. The method of claim 13 wherein the step of applying an adhesive comprises applying an adhesive composition wherein the one or more oligomer-based compounds of binder component B have an average molecular weight of up to about 2000.

15. The method of claim 13 wherein the step of applying an adhesive comprises applying an adhesive composition wherein the one or more oligomer-based compounds of binder component B have an average molecular weight of from about 800 to about 1000.

16. The method of claim 1 wherein the step of applying an adhesive comprises applying an adhesive composition wherein the macromonomer of binder component A has an average molecular weight of from about 700 to about 5000.

17. The method of claim 1 wherein the step of applying an adhesive comprises applying an adhesive composition wherein the macromonomer of binder component A has an average molecular weight of from about 1000 to about 2500.

18. The method of claim 1 wherein the step of applying an adhesive comprises applying an adhesive composition that in the fresh state has a melt viscosity of from about 500 to about 3000 mPas at temperatures of about 70 to about 90° C.

19. The method of claim 1 wherein the step of applying an adhesive comprises applying an adhesive composition that in the fresh state has a melt viscosity of from about 800 to about 2500 mPas at temperatures of 70 to 90° C.

20. The method of claim 1 further comprising the step of exposing the adhesive composition to high-energy radiation.

21. The method of claim 1 further comprising the step of exposing the adhesive composition to UV light.

22. The method of claim 2 wherein the step of applying an adhesive comprises applying the adhesive to the label at application temperatures of the adhesive of from about 20 to about 40° C. above the wall temperature of the plastic bottle.

23. A labelled plastic container comprising a label having a first portion coated at least in part with an adhesive composition comprising a binder component A comprising a curable polyfunctional macromonomer compound containing both moisture-curing isocyanate groups and olefinically unsaturated radically reactive groups, the isocyanate groups and olefinically unsaturated radically reactive groups being cured by different reaction mechanisms, the label being wrapped around a plastic container and having a second portion which overlaps and is in direct contact with the adhesive on the first portion of the label.

* * * * *